(12) United States Patent
Xia et al.

(10) Patent No.: US 10,050,983 B2
(45) Date of Patent: Aug. 14, 2018

(54) COMMUNICATION SYSTEM, RECEIVING APPARATUS, RECEIVING METHOD, AND COMPUTER PROGRAM PRODUCT

(71) Applicant: Kabushiki Kaisha Toshiba, Minato-ku (JP)

(72) Inventors: Zhengfan Xia, Kawasaki (JP); Takeshi Kawabata, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 159 days.

(21) Appl. No.: 15/266,606

(22) Filed: Sep. 15, 2016

(65) Prior Publication Data

US 2017/0142137 A1    May 18, 2017

(30) Foreign Application Priority Data

Nov. 13, 2015   (JP) .................................. 2015-223277
Aug. 31, 2016   (JP) .................................. 2016-170042

(51) Int. Cl.
H04L 29/06        (2006.01)

(52) U.S. Cl.
CPC ...... H04L 63/1416 (2013.01); H04L 63/0245 (2013.01)

(58) Field of Classification Search
CPC ........................ H04L 63/1416; H04L 63/0245
See application file for complete search history.

(56) References Cited

U.S. PATENT DOCUMENTS 7,337,316 B1 *   2/2008   Evans ...................... H04L 63/12
                                                                    380/262
9,319,446 B2 *   4/2016   Panje ...................... H04L 65/60
(Continued)

FOREIGN PATENT DOCUMENTS

JP     2012-114537 A     6/2012
JP     2012-186635 A     9/2012
(Continued)

OTHER PUBLICATIONS

Markus Gronstad, "Implementation of a communication protocol for CubeSTAR", University of Oslo, Retrieved From https://www.duo.uio.no/bitstream/handle/10852/10975/thesis.pdf, Published Jul. 2010 (Year: 2010).*

*Primary Examiner* — Chau Le
(74) *Attorney, Agent, or Firm* — Oblon, McClelland, Maier & Neustadt, L.L.P.

(57) ABSTRACT

According to an embodiment, a communication system includes a transmitting apparatus and a receiving apparatus. The transmitting apparatus generates a pseudorandom number based on an algorithm, synchronously with the receiving apparatus; generates a communication frame identifier including a frame identifier indicating a type of a communication frame and the pseudorandom number to generate the communication frame; and transmits the communication frame. The receiving apparatus generates a pseudorandom number based on the algorithm, synchronously with the transmitting apparatus; receives the communication frame; compares the pseudorandom number included in the communication frame identifier with the pseudorandom number generated by the receiving apparatus and compares the frame identifier included in the communication frame identifier with a predetermined frame identifier; and performs one of making use of the communication frame, discarding the communication frame, and determining that the communication frame is an attack from an unauthorized party, based on comparison results.

18 Claims, 8 Drawing Sheets

(56) References Cited

U.S. PATENT DOCUMENTS

| | | | | |
|---|---|---|---|---|
| 9,325,586 | B1* | 4/2016 | Mizrahi | H04L 43/0847 |
| 2002/0032774 | A1* | 3/2002 | Kohler, Jr. | H04L 43/00 |
| | | | | 709/225 |
| 2005/0271087 | A1* | 12/2005 | Amagai | G01R 13/32 |
| | | | | 370/516 |
| 2009/0024758 | A1* | 1/2009 | Levy-Abegnoli | H04L 45/745 |
| | | | | 709/237 |
| 2010/0278087 | A1* | 11/2010 | Kawakami | H04W 52/0216 |
| | | | | 370/311 |
| 2013/0107118 | A1* | 5/2013 | Panje | H04L 7/042 |
| | | | | 348/525 |
| 2013/0139252 | A1* | 5/2013 | Paranjape | H04L 63/123 |
| | | | | 726/22 |
| 2014/0040992 | A1 | 2/2014 | Koide et al. | |
| 2014/0310530 | A1 | 10/2014 | Oguma et al. | |
| 2015/0089236 | A1* | 3/2015 | Han | H04L 9/3242 |
| | | | | 713/181 |
| 2017/0289105 | A1* | 10/2017 | Minakuchi | H04L 47/2483 |
| 2018/0048663 | A1* | 2/2018 | Yura | H04L 63/1416 |

FOREIGN PATENT DOCUMENTS

| | | |
|---|---|---|
| JP | 2013-48374 A | 3/2013 |
| JP | 2013-98719 A | 5/2013 |
| JP | 2014-17733 A | 1/2014 |
| JP | 2014-183395 A | 9/2014 |

* cited by examiner

US 10,050,983 B2

COMMUNICATION SYSTEM, RECEIVING APPARATUS, RECEIVING METHOD, AND COMPUTER PROGRAM PRODUCT

CROSS-REFERENCE TO RELATED APPLICATIONS

This application is based upon and claims the benefit of priority from Japanese Patent Applications No. 2015-223277, filed on Nov. 13, 2015, and No. 2016-170042, filed on Aug. 31, 2016; the entire contents of which are incorporated herein by reference.

FIELD

Embodiments described herein relate generally to a communication system, a receiving apparatus, a receiving method, and a computer program product.

BACKGROUND

Used as a backbone network between electronic control units (ECUs) installed onboard a vehicle is, for example, a controller area network (CAN). A CAN has an interface for enabling an addition of an ECU, and therefore, it is quite possible for a malicious third party to access the CAN via the interface, and to transmit an illegitimate communication frame (message) from the external. The header part of a communication frame for a CAN has an identification field in which a frame identifier (arbitration ID) indicating the type of the communication frame is stored. The arbitration ID is fixed for each type of the communication frame. For example, some third party can eavesdrop a communication frame over the CAN, identify (analyze) the arbitration ID stored in the header part, create an illegitimate communication frame using the identified arbitration ID, and transmit the frame.

Known as a technology for improving the security in the CAN is a technology for transmitting a communication frame in which a digital signature using a public key encryption and ordinary data are stored in the field for storing data to be transmitted (data field), for example, and for causing the receiver to validate the digital signature and to confirm the legitimacy of the transmitter thereby. Also known is a technology for detecting an abnormal message by including, in the header part of the communication frame, for example, a sequence number mapped to an identifier indicating the type of a communication frame, as security information, along with the identifier. Also, known is a technology for updating the frame identifier indicating the type of the communication frame, for each transmission of a communication frame, for example.

DETAILED DESCRIPTION

According to an embodiment, a communication system includes a transmitting apparatus; and a receiving apparatus that is connected to the transmitting apparatus. The transmitting apparatus includes a first generator, a second generator, and a transmitter. The first generator generates a pseudorandom number with two or more bits based on an algorithm common to the receiving apparatus, synchronously with the receiving apparatus. The second generator generates a communication frame identifier at least including a frame identifier and the pseudorandom number and generates the communication frame. The frame identifier indicates a type of a communication frame representing a unit of data transmitted and received in a communication. The transmitter transmits the communication frame. The receiving apparatus includes a third generator, a receiver, a comparator, and at processor. The third generator generates a pseudorandom number based on the algorithm, synchronously with the transmitting apparatus. The receiver receives the communication frame. The comparator compares the pseudorandom number included in the communication frame identifier with the pseudorandom number generated by the third generator and compares the frame identifier included in the communication frame identifier with a frame identifier that is predetermined to be received by the receiving apparatus. The processor performs any one of a frame process for making use of the communication frame, a discarding process for discarding the communication frame, and an attack determination process for determining that the communication frame is an attack from an unauthorized third party, based on a comparison result of the comparator.

An embodiment will now be explained in detail, with reference to the appended drawings.

Figure 1:
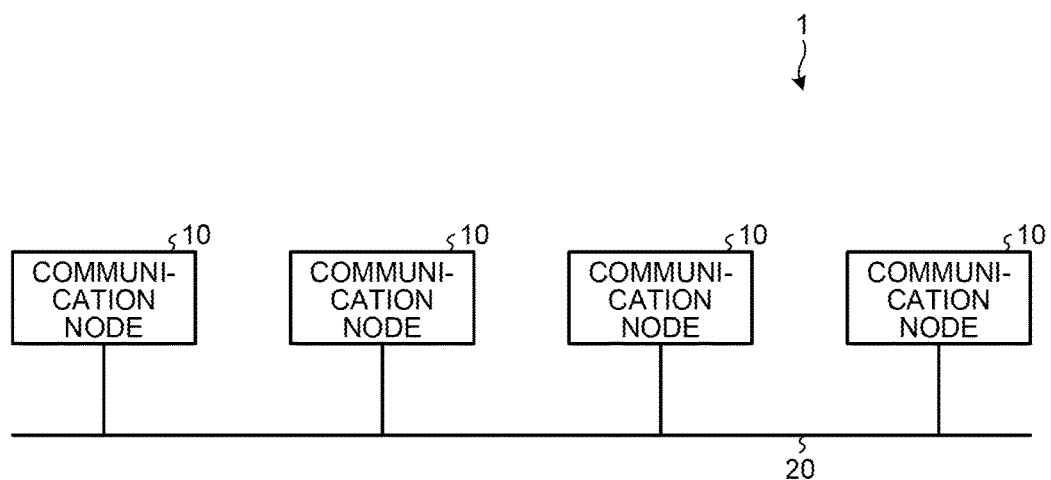
FIG. 1 is a schematic illustrating an exemplary configuration of a communication system according to an embodiment.

FIG. 1 is a schematic generally illustrating an exemplary configuration of a communication system 1 according to the embodiment. As illustrated in FIG. 1, the communication system 1 includes a plurality of communication nodes 10, and these communication nodes 10 are connected to one another over a communication line (bus) 20. The communication system 1 according to the embodiment is configured as an onboard network system which is a network deployed onboard a vehicle, and each of the communication nodes 10 is configured as an electronic control unit (ECU).

The transmissions and the receptions of communication frames among the communication nodes 10 are performed according to the Carrier Sense Multiple Access with Collision Resolution (CSMA/CR). More specifically, the transmissions and the receptions of communication frames among the communication nodes 10 are performed based on a CAN or a CAN with flexible data rate (CAN-FD). In this example, the transmissions and the receptions of communication frames among the communication nodes 10 are performed according to CAN protocols. The communication frame herein represents a unit of data that is transmitted or received in a communication, and is sometimes referred to as a "message".

When any one of the communication nodes 10 transits to a state enabled to transmit a communication frame, the communication node 10 checks whether the communication line 20 is busy (whether the communication line 20 is unavailable). If the communication line 20 is not busy, the communication node 10 transmits the communication frame over the communication line 20. In the embodiment, because the communication frames are exchanged among the communication nodes 10 according to CAN protocols, the communication frames include no address of the transmitter communication node 10 ("transmitting apparatus") nor of the receiver communication node 10 ("receiving apparatus"), but includes an arbitration ID, instead. The arbitration ID is an example of a frame identifier indicating the type of the communication frame, and is a unique ID for identifying the communication frame (message) and representing the priority of the communication frame. In the explanation hereunder, the arbitration ID is sometimes referred to as a "frame identifier". When the transmitter communication node 10 transmits a communication frame via the communication line 20, each one of the other communication nodes 10 connected to the communication line 20 receives the communication frame, checks the frame identifier included in the received communication frame, and determines how the communication frame is to be handled. This process will be described more in detail later.

Figure 2:
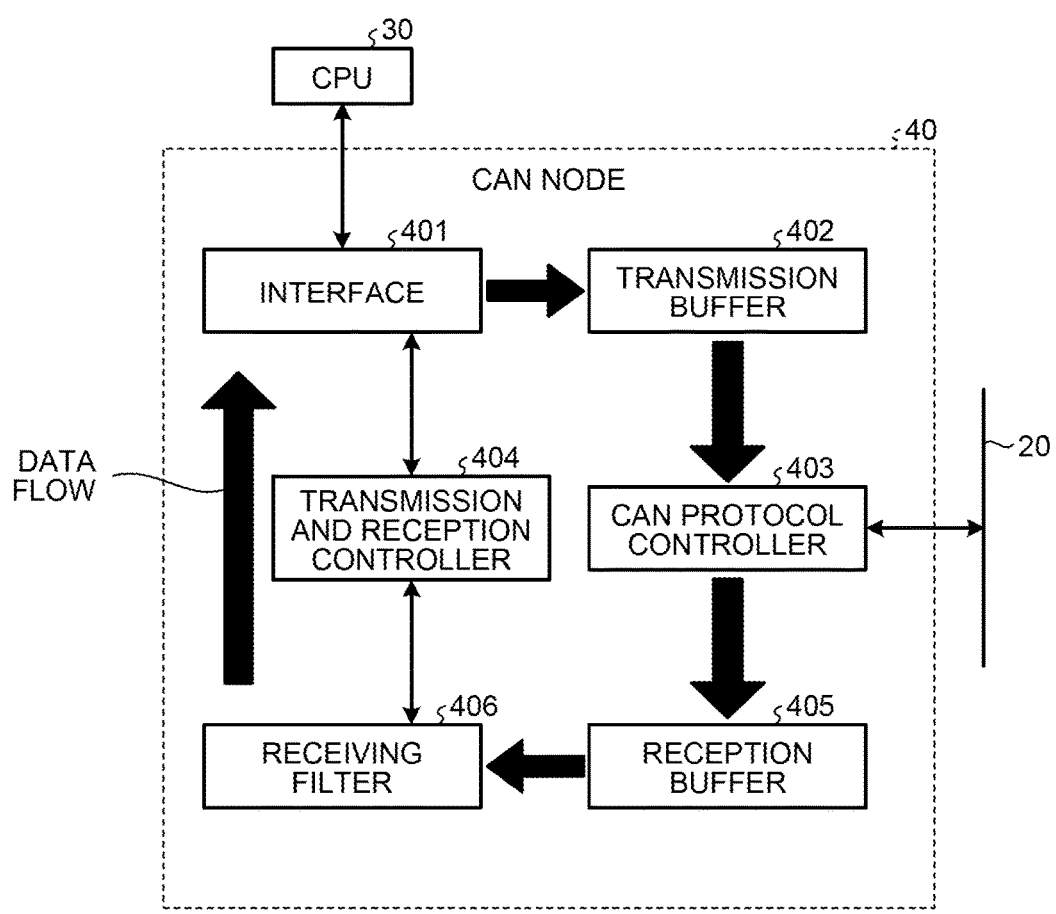
FIG. 2 is a schematic illustrating an exemplary configuration of a communication node according to the embodiment.

FIG. 2 is a schematic illustrating an exemplary configuration of the communication node 10. For the convenience of the explanation, only one communication node 10 is illustrated in FIG. 2 as an example, but the other communication nodes 10 have the same configuration. As illustrated in FIG. 2, the communication node 10 includes at CPU 30 and a CAN node 40.

Figure 3:
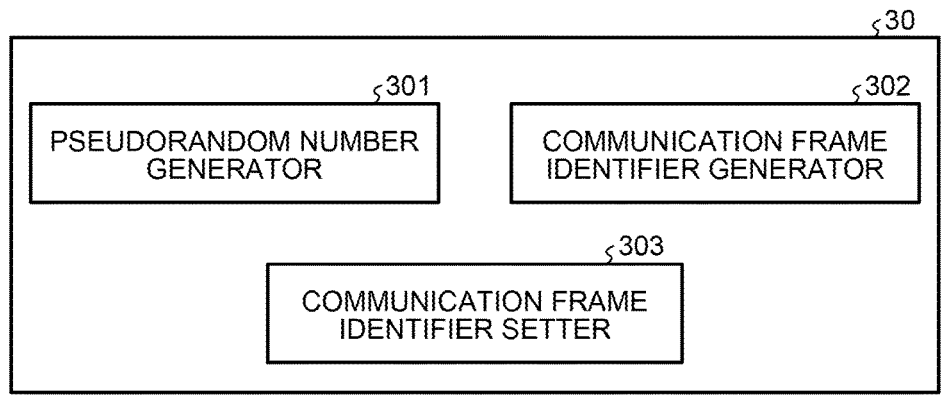
FIG. 3 is a schematic illustrating exemplary functions provided to a CPU according to the embodiment.

FIG. 3 is a schematic illustrating exemplary functions provided to the CPU 30. As illustrated in FIG. 3, the CPU 30 includes a pseudorandom number generator 301, a communication frame identifier generator 302, and a communication frame identifier setter 303. These functions are implemented by causing the CPU 30 to execute a computer program stored in a storage device (not illustrated). At least a part of these functions may be implemented as a dedicated hardware circuit (such as an integrated semiconductor circuit). Furthermore, the functions related to the embodiment are mainly illustrated in the example in FIG. 3, but the functions provided to the CPU 30 are not limited to those illustrated.

The pseudorandom number generator 301 generates a pseudorandom number with, two or more bits based on an algorithm common to the other communication nodes 10, synchronously with the other communication nodes 10. When the communication node 10 operates as the transmitter communication node 10 (transmitting apparatus), the pseudorandom number generator 301 (first generator) generates a pseudorandom number with two or more bits (second pseudorandom number) based on the algorithm common to the receiver communication node 10, synchronously with the receiver communication node 10. When the communication node 10 operates as the receiver communication node 10 (receiving apparatus), the pseudorandom number generator 301 (third generator) generates a pseudorandom number with two or more bits (first pseudorandom number) based, on the algorithm common to the transmitter communication node 10, synchronously with the transmitter communication node 10.

In the embodiment, when the communication system 1 is started, the pseudorandom number generator 301 generates a pseudorandom number by performing a computation based on the algorithm, using the same predetermined initial value (seed for generating a random number). In this example, it is assumed that the predetermined initial value is embedded in each of the communication nodes 10. The pseudorandom number generator 301 also updates the pseudorandom number by performing the computation based on the algorithm every time a communication frame is successfully transmitted by the transmitter communication node 10 and received by the receiver communication node 10.

Explained herein is an example in which the CPU 30 has the function of the pseudorandom number generator 301, but the embodiment is not limited to such an example, and the CAN node 40 may have the function of the pseudorandom number generator 301, for example, in the manner to be described later.

The explanation of FIG. 3 will be continued. The communication frame identifier generator 302 is a function executed when the communication node 10 operates as the transmitter communication node 10 (transmitting apparatus), and generating a communication frame identifier at least including a frame identifier indicating the type of the communication frame to be transmitted, and the pseudorandom number generated by the pseudorandom number generator 301 (latest pseudorandom number).

Figure 4:
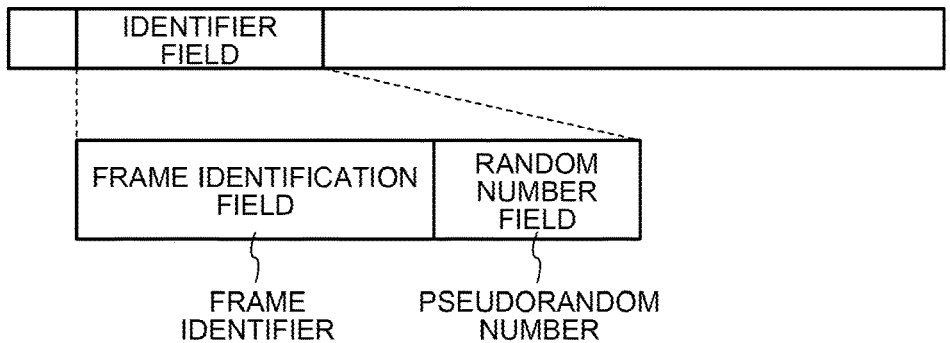
FIG. 4 is a schematic illustrating an exemplary communication frame according to the embodiment.

FIG. 4 illustrates an exemplary communication frame including a communication frame identifier generated by the communication frame identifier generator 302. The identifier field, which is the field at the head of the communication frame, stores therein a frame identifier, and the pseudorandom number generated by the pseudorandom number generator 301. In the example illustrated in FIG. 4, the identifier field is divided into a frame identification field and a random number field. The frame identification field stores therein a frame identifier, and the random number-field stores therein a pseudorandom number. The embodiment is, however, not limited thereto, and the identifier field may store therein the frame identifier and the pseudorandom number, without the identifier field being divided into two fields, for example. Generally speaking, more significant bits of the frame identifier provides information indicating the priority of the communication frame, so the priority is changed if the pseudorandom number is added to the more significant, bits of the frame identifier. Therefore, it is preferable to maintain the priority by appending the pseudorandom number to the less significant side of the frame identifier. This ordering is included in the scope of "generating a communication frame identifier at least including a frame identifier and a pseudorandom number".

The explanation of FIG. 3 will now be continued. The communication frame identifier setter 303 sets a communication frame identifier that includes a type of a communication frame that is to be received by the receiver communication node (the communication node 10).

The explanation will now be continued by referring back to FIG. 2. As illustrated in FIG. 2, the CAN node 40 includes an interface 401, a transmission buffer 402, a CAN protocol controller 403, a transmission and reception controller 404, a reception buffer 405, and a receiving filter 406. In the example illustrated in FIG. 2, the elements related to the embodiment are mainly illustrated, but the elements of the CAN node 40 are not limited to those illustrated.

The interface 401 is an interface for connecting with the CPU 30, and generates a CAN frame. A generated CAN frame is stored in the transmission buffer 402.

The CAN protocol controller 403 checks whether the communication line 20 is busy, and notifies the transmission and reception controller 404 of the result of checking. If there is any communication frame having not been transmitted yet in the transmission buffer 402, and the communication line 20 is not busy, the transmission and reception controller 404 requests the CAN protocol controller 403 to transmit the communication frame stored in the transmission buffer 402. The CAN protocol controller 403 receiving this request transmits the communication frame stored in the transmission buffer 402 to the other communication nodes 10 via the communication line 20. The CAN protocol controller 403 has a function for monitoring whether the transmission of the communication frame has been successful, and is capable of notifying the CPU 30 of the monitoring result.

The CAN protocol controller 403 also has a function of receiving a communication frame from another communication node 10 (the transmitter communication node 10) via the communication line 20, and stores the communication frame received from the transmitter communication node 10 in the reception buffer 405.

The receiving filter 406 acquires a frame identifier with one or more bits (frame identifier that is predetermined to be received by the receiver communication node) set by the CPU 30 (the communication frame identifier setter 303), and the pseudorandom number generated by the CPU 30 (the pseudorandom number generator 301). In this example, the receiving filter 406 acquires the frame identifier set by the CPU 30, and the pseudorandom number generated, by the CPU 30 from the CPU 30 via the interface 401 and the transmission and reception controller 404.

Figure 5:
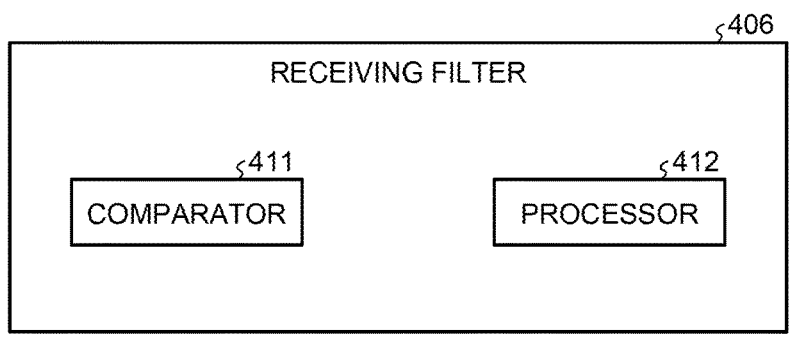
FIG. 5 is a schematic illustrating exemplary functions provided to a receiving filter according to the embodiment.

The functions of the receiving filter 406 will now be explained in detail. FIG. 5 is a schematic illustrating exemplary functions provided to the receiving filter 406. As illustrated in FIG. 5, the receiving filter 406 includes a comparator 411 and a processor 412.

The comparator 411 compares the pseudorandom number included in a communication frame identifier (the communication frame identifier included in at received communication frame) with the pseudorandom number generated by the CPU 30 (the pseudorandom number generator 301), and compares the frame identifier included in the communication frame identifier with the frame identifier with one or more bits that is predetermined to be received by the receiver-communication node. In the embodiment, the comparator 411 compares the pseudorandom number included in the communication frame identifier that is included in a communication frame stored in the reception buffer 405 with the pseudorandom number acquired from the CPU 30, and compares the frame identifier included in the communication frame identifier with the frame identifier with one or more bits acquired from the CPU 30.

The processor 412 performs any one of processes including a frame process for making use of the communication frame, a discarding process for discarding the communication frame, and an attack determination process for determining that the communication frame is an attack front an unauthorized third party, depending on the comparison result of the comparator 411. More specifically, the processor 412 performs the frame process if the pseudorandom number included in the communication frame identifier that is included in the communication frame stored in the reception buffer 405 (received communication frame) matches the pseudorandom number generated by the CPU 30 (the pseudorandom number generator 301), and the frame identifier included in the communication frame identifier matches the frame identifier with one or more bits that is predetermined to be received by the receiver communication node (receiving apparatus). Under this condition, the processor 412 determines that the reception of the communication frame has been "successful", and is enabled to pass the determination result and the received communication frame to the CPU 30. Through this process, the CPU 30 can acknowledge that the reception of the communication frame has been successful.

The processor 412 performs the discarding process if the pseudorandom number included in the communication frame identifier that is included in the communication frame stored in the reception buffer 405 matches the pseudorandom number generated by the CPU 30, and if the frame identifier included in the communication frame identifier does not match the frame identifier with one or more bits that is predetermined to be received by the receiver communication node. Under this condition, the processor 412 determines that the reception of the communication frame has been "successful", and is enabled to notify the CPU 30 of the determination result, and that the communication frame has been discarded. Through this process, the CPU 30 can acknowledge that the reception of the communication frame has been successful. In this example, as long as the pseudorandom number included in the communication frame identifier in the received communication frame matches the pseudorandom number generated by the CPU 30, the processor 412 determines that the reception of the communication frame has been, "successful" (in other words, the processor 412 authenticates the source of the communication frame), regardless of whether the frame identifier included in the communication frame matches the frame identifier with one or more bits that is predetermined to be received by the receiver communication node.

The processor 412 performs the attack determination process if the pseudorandom number included in the communication frame identifier that is included in the communication frame stored in the reception buffer 405 does not match the pseudorandom number generated by the CPU 30. In this case, the processor 412 performs the attack determination process even if the frame identifier included in the communication frame identifier matches the frame identifier with one or more bits that is predetermined to be received by the receiver communication node. In this case, the receiver communication node 10 determines that the reception of the communication frame has "failed", and notifies the CPU 30 of the determination result, and that the attack determination process has been performed. Through this process, the CPU 30 can acknowledge that the reception of the communication frame has failed, and there is an attack from an unauthorized third party. In this case, the CPU 30 can also output warning information giving a warning that, for example, there has been, an attack from an unauthorized third party (and which may be information for prompting to stop the vehicle, for example). This warning information may be output in any way. For example, the warning information may be displayed on a display device (display) as image information, or may be output from a speaker as sound information.

In this condition, the processor 412 also notifies the CAN protocol controller 403 that the reception of the communication frame has "failed". The CAN protocol controller 403 receiving the notification then outputs a signal indicating that the reception of the communication frame has "failed" (e.g., one-bit information, indicating an error) to the communication line 20. This signal enables the CAN protocol controller 403 included in the transmitter communication node 10 to detect that the transmission of the communication frame has failed. In this example, the CAN protocol controller 403 in the transmitter communication node 10 detects whether the transmission of the communication frame has been successful by checking the status of the communication line 20 for a certain time period, subsequently to the transmission of the communication frame.

Explained herein is an example in which the receiving filter 406 has a function of the processor 412, but the embodiment is not limited thereto. For example, the CPU 30 may be configured to have the function of the processor 412 described above.

The CAN node 40 has the configuration described above. In the embodiment, each of the interface 401, the transmission buffer 402, the CAN protocol controller 403, the transmission and reception controller 404, the reception buffer 405, and the receiving filter 406 explained above is implemented as a dedicated hardware circuit (such as an integrated semiconductor circuit), but the embodiment is not limited thereto. For example, each of the functions of the CAN protocol controller 403, the transmission and reception controller 404, and the receiving filter 406 may be implemented by causing a CPU (a CPU that is separate from the CPU 30) implemented on the CAN node 40 to execute a computer program stored in a storage device, not illustrated.

Furthermore, in the embodiment, the communication node 10 includes the CPU 30 and the CAN node 40 separately from each other, but the embodiment is not limited thereto. For example, the communication node 10 may be configured as one device capable of implementing the functions provided to the CPU 30 and the functions provided to the CAN node 40 explained above. A possible exemplary hardware configuration of the one device is provided with a CPU, a storage device such as a ROM and a RAM, an interface for connecting with the communication line 20 (interface for transmitting and receiving communication frames in accordance with the CAN protocols), the transmission buffer 402, the reception buffer 405, and the like. Such a configuration may implement the functions of the pseudorandom number generator 301, the communication frame identifier generator 302, the communication frame identifier setter 303, the CAN protocol controller 403, the transmission and reception controller 404, and the receiving filter 406 described above by, for example, causing the CPU to execute a computer program stored in the storage device. Furthermore, at least a part of these functions may be implemented as a dedicated hardware circuit (e.g., an integrated semiconductor circuit).

In summary, the communication node 10 may have any configuration including a first generator, a second generator, and a transmitter, as the functions for operating as the transmitter communication node 10 (transmitting apparatus). The first generator is a function for generating a pseudorandom number with two or more bits based on the algorithm common to the receiving apparatus, synchronously with the receiving apparatus. In this example, the first generator corresponds to the function of the pseudorandom number generator 301. The second generator is a function for generating a communication frame at least including a frame identifier indicating the type of the communication frame and a pseudorandom number generated by the first generator. In this example, the second generator corresponds to the function of the communication frame identifier generator 302. The transmitter is a function for transmitting the communication frame. In this example, the transmitter corresponds to the function of the CAN protocol controller 403 or to the transmission and reception controller 404.

The communication node 10 may have any configuration including a third generator, a receiver, a comparator, and a processor, as the functions for operating as the receiver communication node 10 (receiving apparatus). The third generator is a function for generating a pseudorandom number based on the algorithm, synchronously with the transmitting apparatus. In this example, the third generator corresponds to the function of the pseudorandom number generator 301. The receiver is a function for receiving a communication frame. In this example, the receiver corresponds to the function of the CAN protocol controller 403. The comparator is a function for comparing the pseudorandom number included in the communication frame identifier that is included in the received communication frame with the pseudorandom number generated by the third generator, and comparing the frame identifier included in the communication frame identifier with the frame identifier with one or more bits that is predetermined to be received by the receiving apparatus. In this example, the comparator corresponds to the function of the receiving filter 406 (the comparator 411). The processor is a function for performing one of the frame process for permitting reception of the communication frame, the discarding process for discarding the communication frame, and the attack determination process for determining that the communication frame is an attack from an unauthorized third party, based on the comparison result of the comparator. In this example, the processor corresponds to the function of the receiving filter 406 (the processor 412).

The communication node 10 according to the embodiment includes both of the function for operating as the transmitter communication node 10 (transmitting apparatus) (the first generator, the second generator, and the transmitter), and the function for operating as the receiver communication node 10 (receiving apparatus) (the third generator, the receiver, the comparator, and the processor).

Figure 6:
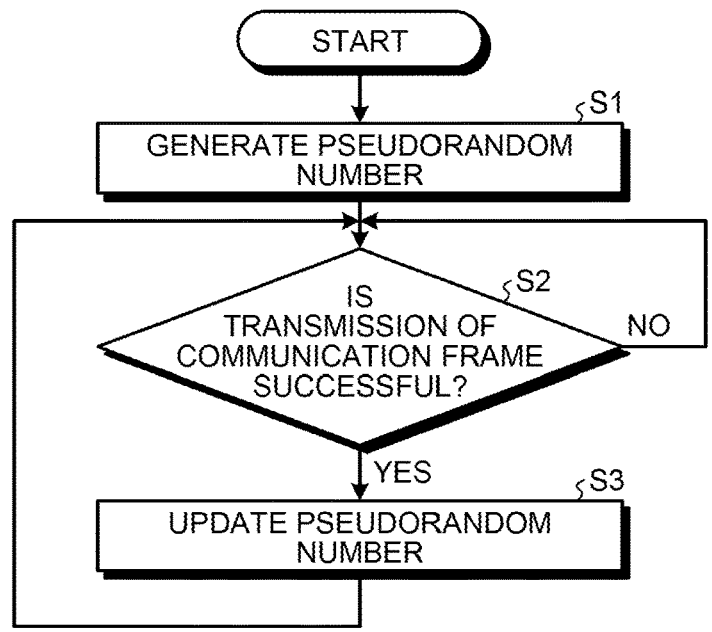
FIG. 6 is a schematic illustrating an exemplary process in which a transmitting apparatus generates a pseudorandom number in the embodiment.

FIG. 6 is a flowchart illustrating an exemplary process in which the transmitter communication node 10 (transmitting apparatus) generates a pseudorandom number. To begin with, when the communication system 1 is started, the pseudorandom number generator 301 generates a pseudorandom number by performing a computation, based on the algorithm common to the receiver side, using the initial value (seed) having been commonly assigned to all of the communication nodes 10 in advance (Step S1). The communication frame identifier generator 302 then generates a communication frame including an identifier field storing therein a communication frame identifier that includes the pseudorandom number generated at Step S1 and the frame identifier indicating the type of the communication frame to be transmitted, and the communication frame is then transmitted. If it is determined that the transmission of the communication frame has been successful (Yes at Step S2), the pseudorandom number generator 301 updates the pseudorandom number by performing a computation based on the algorithm (Step S3). Subsequently, at each timing at which a communication frame is transmitted, a communication frame including an identifier field, in which a communication frame identifier including the pseudorandom number updated at Step S3 and the frame identifier indicating the type of the communication frame to be transmitted are stored, is generated and transmitted, and the process at Step S2 and thereafter are repeated.

Figure 7:
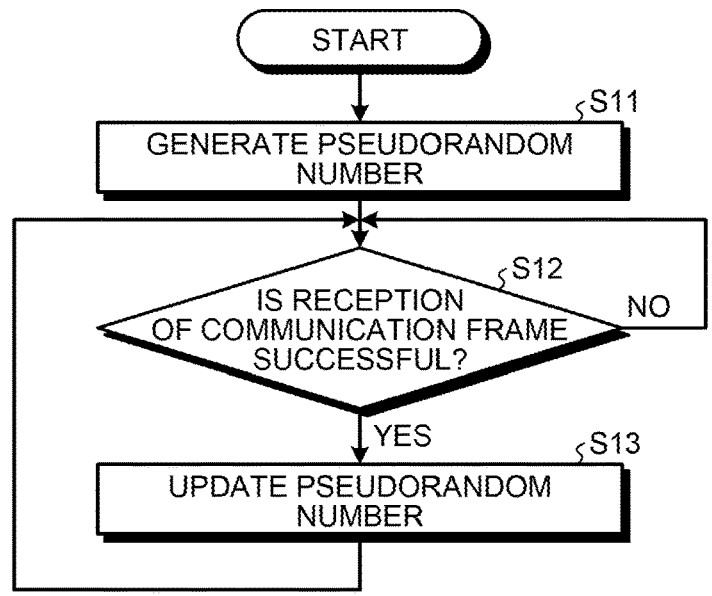
FIG. 7 is a schematic illustrating an exemplary process in which a receiving apparatus generates a pseudorandom number in the embodiment.

FIG. 7 is a flowchart illustrating an exemplary process in which the receiver communication node 10 (receiving apparatus) generates a pseudorandom number. To begin with, when the (communication system 1 is started, the pseudorandom number generator 301 generates a pseudorandom number by performing a computation based on the algorithm common to the transmitter side, using the initial value having been commonly assigned to all of the communication nodes 10 in advance (Step S11). If it is determined that the reception of the communication frame has been successful based on the communication frame received from the transmitter communication node 10, the pseudorandom number generated at Step S11, and the frame identifier with one or more bits that is predetermined to be received by the receiver communication node (Yes at Step S12), the pseudorandom number generator 301 updates the pseudorandom number by performing a computation based on the algorithm (Step S13). The way for determining that the reception of the communication frame has been successful is as described above. Every time a communication frame is received from the transmitter communication node 10, it is determined whether the reception of the communication frame has been successful based on the received communication frame, the pseudorandom number updated at Step S13, and the frame identifier with one or more bits that is predetermined to be received by the receiver communication node, and the process at Step S12 and thereafter are repeated.

Figure 8:
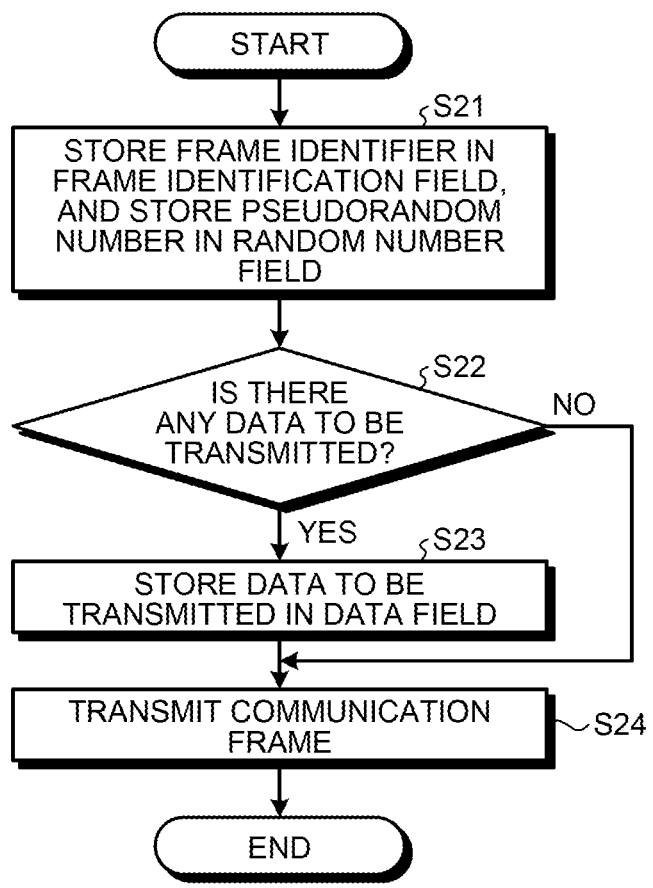
FIG. 8 is a schematic illustrating an exemplary process in which the transmitting apparatus transmits a communication frame in the embodiment.

FIG. 8 is a flowchart illustrating an exemplary process in which the transmitter communication node 10 (transmitting apparatus) transmits a communication frame. It is assumed herein that the pseudorandom number has already been generated (updated) by the pseudorandom number generator 301. As illustrated in FIG. 8, the communication frame identifier generator 302 stores the frame identifier indicating the type of the communication frame to be transmitted in the frame identification field, and stores the pseudorandom number having already been generated by the pseudorandom number generator 301 (latest pseudorandom number) in the random number field (Step S21). The communication frame identifier generator 302 then checks whether there is any data to be transmitted (Step S22). If the result at Step S22 is positive (Yes at Step S22), the communication frame identifier generator 302 stores the data to be transmitted in the field for storing the data in the communication frame (data field) (Step S23). In this example, the data field is a field subsequent to the identifier field. The communication frame to be transmitted is generated in the manner described above, and the generated communication frame is stored in the transmission buffer 402.

If the communication line 20 is not busy, the transmission and reception controller 404 requests a transmission of a communication frame from the CAN protocol controller 403, and the CAN protocol controller 403 receiving this request transmits the communication frame stored in the transmission buffer 402 to the communication line 20 (Step S24).

Figure 9:
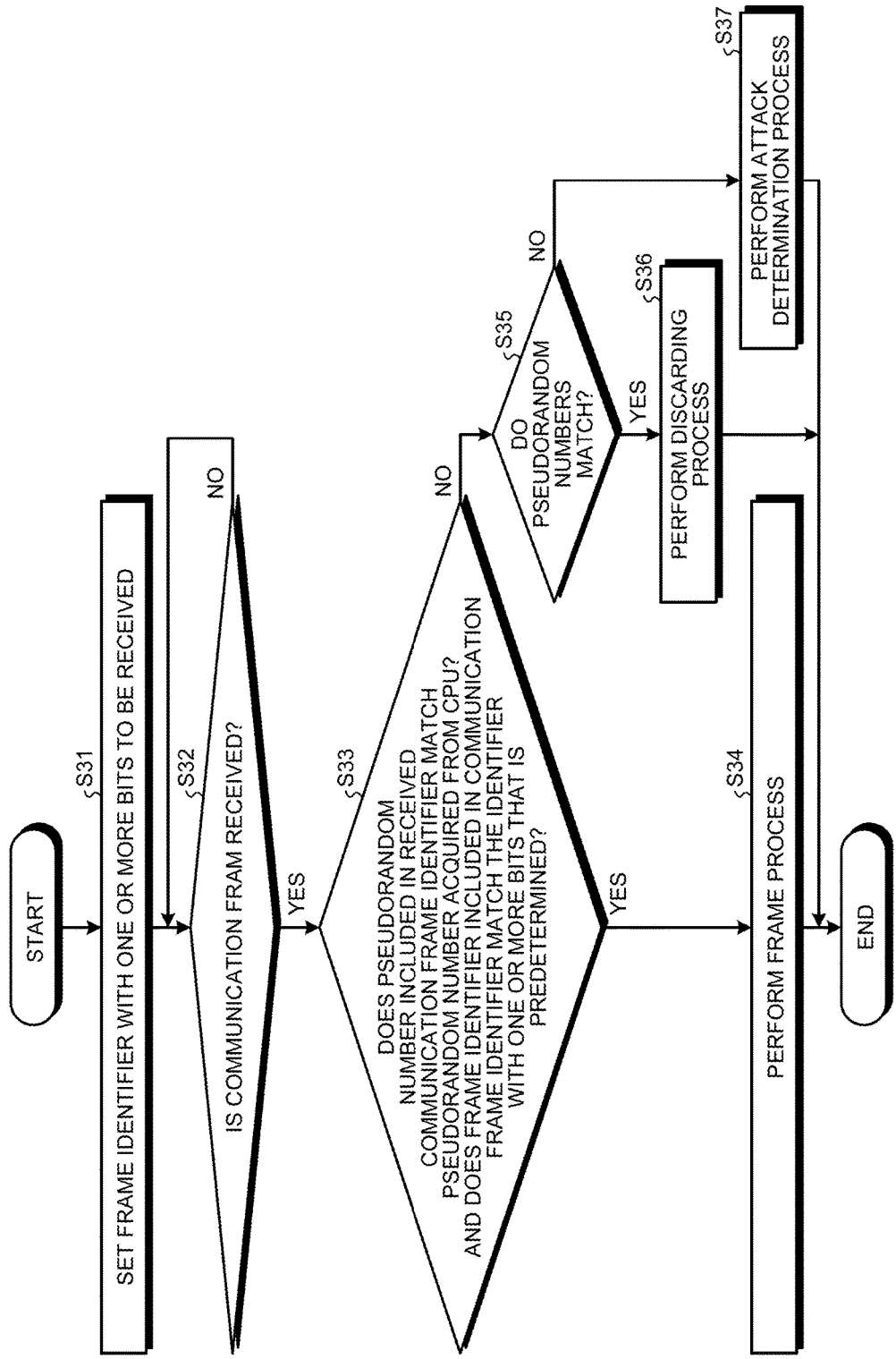
FIG. 9 is a schematic illustrating an exemplary process in which the receiving apparatus receives a communication frame in the embodiment.

FIG. 9 is a flowchart illustrating an exemplary process in which the receiver communication node 10 (receiving apparatus) receives a communication frame. It is assumed herein that the pseudorandom number has already been generated (updated) by the pseudorandom number generator 301. As illustrated in FIG. 9, the CPU 30 (the communication frame identifier setter 303) sets the frame identifier with one or more bits to be received (Step S31). As described earlier, in this example, the receiving filter 406 acquires the frame identifiers set at Step S31 (frame identifier with one or more bits to be received by the receiver communication node) and the pseudorandom number having already been generated by the pseudorandom number generator 301 (latest pseudorandom number) from the CPU 30.

If a communication frame is received from the transmitter communication node 10 (Yes at Step S32), the receiving filter 406 (the comparator 411) checks whether the pseudorandom number included in the communication frame identifier that is included in the received communication frame (the communication frame stored in the reception buffer 405) matches the pseudorandom number acquired from the CPU 30, and whether the frame identifier included in the communication frame identifier matches the frame identifier with one or more bits that is predetermined to be received by the receiver communication node (by the receiving apparatus) (the identifier acquired from the CPU 30) (Step S33). If the result at Step S33 is positive (Yes at Step S33), the receiving filter 406 (the processor 412) performs the frame process described above (Step S34).

If the result of Step S33 is negative (No at Step S33), the receiving filter 406 (the comparator 411) checks whether the pseudorandom numbers match (Step S35). If the result at Step S35 is positive (Yes at Step S35), the receiving filter 406 (the processor 412) performs the discarding process described above (Step S36). If the result of Step S35 is negative (No at Step S35), the receiving filter 406 (the processor 412) performs the attack determination process described above (Step S37).

Figure 10:
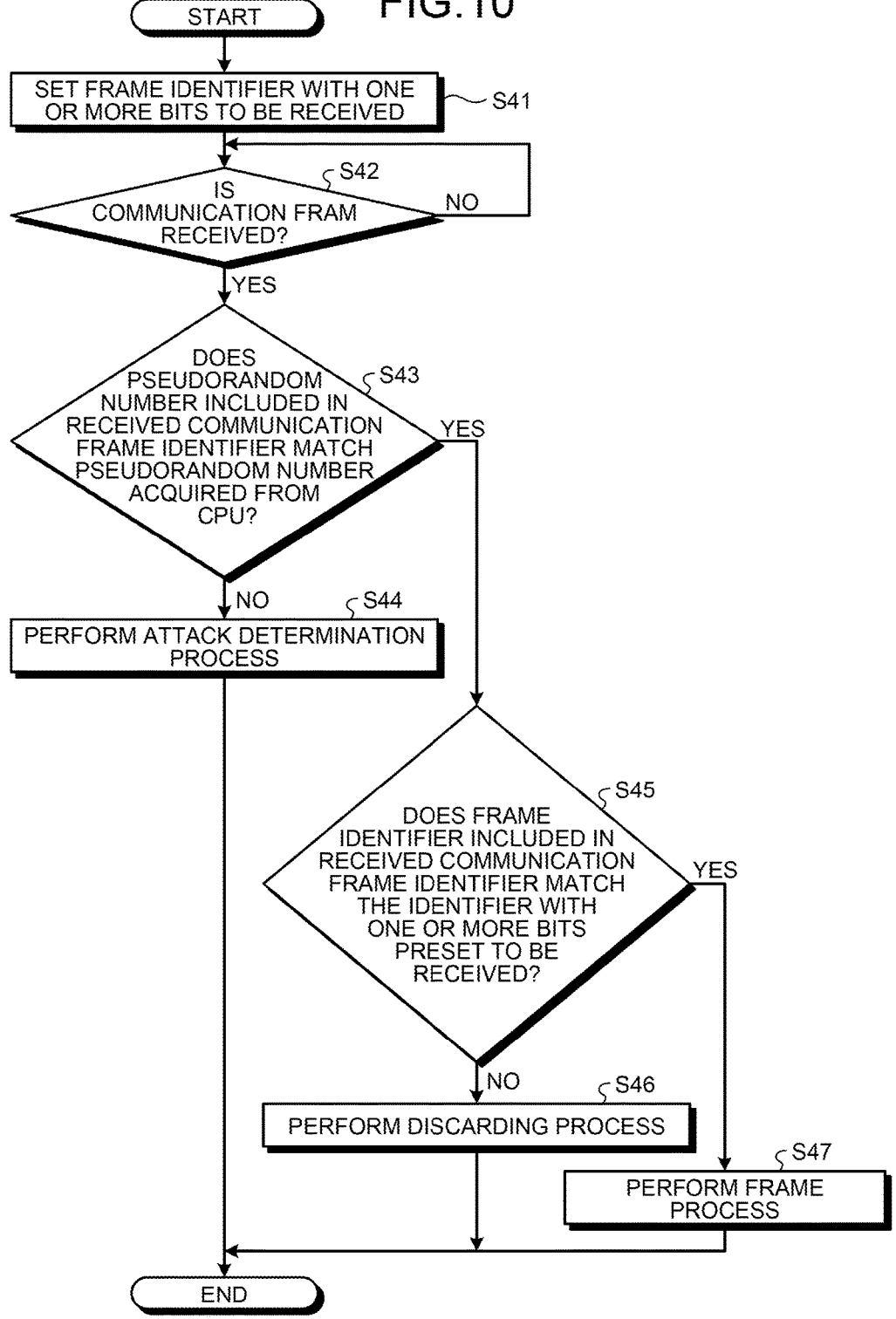
FIG. 10 is a schematic illustrating an exemplary process in which the receiving apparatus receives a communication frame in the embodiment.

FIG. 10 is a flowchart illustrating another exemplary process in which the receiver communication node 10 (receiving apparatus) receives a communication frame. It is assumed herein that the pseudorandom number has already been generated (updated) by the pseudorandom number generator 301. As illustrated in FIG. 10, the CPU 30 (the communication frame identifier setter 303) sets the frame identifier with one or more bits to be received (Step S41). As described earlier, in this example, the receiving filter 406 acquires the frame identifier with one or more bits set at Step S41 (the frame identifier with one or more bits to be received by the receiver communication node) and the pseudorandom number having already been generated by the pseudorandom number generator 301 (latest pseudorandom number) from the CPU 30.

When a communication frame is received from the transmitter communication node 10 (Yes at Step S42), the receiving filter 406 (the comparator 411) checks whether the pseudorandom number included in the communication frame identifier in the received communication frame (the communication frame stored in the reception buffer 405) matches the pseudorandom number acquired from the CPU 30 (Step S43). If the result of Step S43 is negative (No at Step S43), the receiving filter 406 (the processor 412) performs the attack determination process described above (Step S44).

If the result at Step S43 is positive (Yes at Step S43), the receiving filter 406 (the comparator 411) checks whether the frame identifier included in the communication frame identifier matches the frame identifier with one or more bits preset to be received by the receiver communication node (by the receiving apparatus) (the frame identifier with one or more bits acquired from the CPU 30) (Step S45). If the result at Step S45 is positive (Yes at Step S45), the receiving filter 406 (the processor 412) performs the frame process described above (Step S47). If the result of Step S45 is negative (No at Step S45), the receiving filter 406 (the processor 412) performs the discarding process described above (Step S46).

The attack determination process (Step S37 in FIG. 9, Step S44 in FIG. 10) may be omitted.

Explained with reference to FIGS. 9 and 10 is an example in which the receiving filter 406 has a function of the comparator 411, but the embodiment is not limited thereto. For example, the CPU 30 may have the function of the comparator 411 explained above.

As explained above, in the embodiment, the transmitter and the receiver each generate a pseudorandom number with two or more bits that are unrelated to the frame identifier, based on the shared algorithm, synchronously with each other. The transmitter then includes the generated pseudorandom number in a communication frame, and transmits the communication frame. The receiver can then check the legitimacy of the transmitter by comparing the pseudorandom number generated synchronously with the transmitter, with the pseudorandom, number included in the received communication frame. Because the information for checking the legitimacy of the transmitter according to the embodiment is a pseudorandom number with two or more bits generated unrelatedly to the frame identifier, an analysis or a prediction of information for checking the legitimacy of the transmitter is more difficult, compared with a configuration in which the legitimacy of the transmitter is checked using a sequence number that is associated with the frame identifier. In this manner, the communication security can be improved further.

Modifications will now be explained. Explanations of the parts that are the same as the embodiment described above are omitted as required.

(1) First Modification

For example, the algorithm described above for generating a pseudorandom number (the algorithm shared among the communication nodes 10) may include a procedure of regularly changing the data length of the pseudorandom number. By changing the length of the pseudorandom number following a predetermined rule, an analysis or a prediction of the pseudorandom number can be made more difficult.

(2) Second Modification

Figure 11:
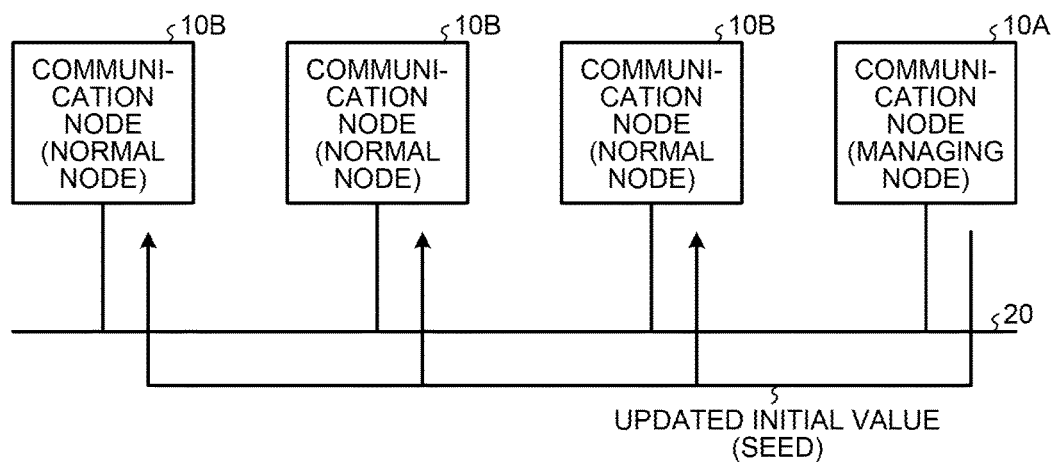
FIG. 11 is a schematic illustrating an exemplary configuration of a communication system according to a modification.

For example, one of the communication nodes 10 included in the communication system 1 may manage the initial value (seed for generating the random number) used in the pseudorandom number generation. In the explanation hereunder, as illustrated in FIG. 11, the communication node 10 managing the initial value is referred to as a "managing node 10A", and the other communication nodes 10 are referred to as "normal nodes 10B". The managing node 10A includes a function of updating the initial value (updater), in addition to the functions provided to the communication node 10 described above. Every time the managing node 10A updates the initial value, the managing node 10A distributes the updated initial value to each of the normal nodes 10B. For example, the updated initial value may be encrypted before being distributed. For example, the managing node 10A may be configured to update the initial value, and distribute the updated initial value to each of the normal nodes 10B every time a communication frame is successfully transmitted and received.

Every time the updated initial value is received, the pseudorandom number generator 301 included in each of the normal nodes 10B generates a pseudorandom number by performing a computation based on the algorithm, using the updated initial value. In the same manner, every time the initial value is updated, the pseudorandom number generator 301 included in the managing node 10A generates a pseudorandom number by performing a computation based on the algorithm, using the updated initial value. In other words, every time the initial value is updated by the updater, each of the communication nodes 10 included in the communication system 1 generates a pseudorandom number by performing a computation based on the algorithm, using the updated initial value.

In summary, the communication system 1 may be configured any way as long as an updater for updating the initial value is included, and the pseudorandom number generator 301 (first generator) included in the transmitter communication node 10 and the pseudorandom number generator 301 (third generator) included in the receiver communication node 10 are configured to generate a pseudorandom number by performing a computation based on the algorithm using an updated initial value every time the initial value is updated by the updater.

The embodiment, and the modifications described above may be combined in any way.

Furthermore, a computer program executed on the communication node 10 according to the embodiment and the modifications may be provided by storing the computer program in a computer connected to a network such as the Internet, and making available for download over the network. Furthermore, the computer program executed on the communication node 10 according to the embodiment and the modifications may be provided or distributed over a network such as the Internet. Furthermore, the computer program executed on the communication node 10 according to the embodiment and the modifications may be provided in a manner incorporated in a nonvolatile recording medium such as a ROM in advance.

While certain embodiments have been described, these embodiments have beers presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system comprising:
a transmitting apparatus; and
a receiving apparatus that is connected to the transmitting apparatus,
the transmitting apparatus comprising:
  a first generator configured to generate a pseudorandom number with two or more bits based on an algorithm common to the receiving apparatus, synchronously with the receiving apparatus;
  a second generator configured to generate a communication frame identifier at least including a frame identifier and the pseudorandom number and to generate a communication frame, the frame identifier indicating a type of the communication frame; and
  a transmitter configured to transmit the communication frame, and
the receiving apparatus comprising:
  a third generator configured to generate a pseudorandom number with two or more bits based on the algorithm, synchronously with the transmitting apparatus;

a receiver configured to receive the communication frame;

a comparator configured to compare the pseudorandom number included in the communication frame identifier with the pseudorandom number generated by the third generator, and to compare the frame identifier included in the communication frame identifier with a frame identifier that is predetermined to be received by the receiving apparatus; and a processor configured to perform any one of a frame process for making use of the communication frame, a discarding process for discarding the communication frame, and an attack determination process for determining that the communication frame is an attack from an unauthorized third party, based on a comparison result of the comparator.

2. The system according to claim 1, wherein the processor is configured to perform the frame process when the pseudorandom number included in the communication frame identifier matches the pseudorandom number generated by the third generator, and the frame identifier included in the communication frame identifier matches the frame identifier that is predetermined to be received by the receiving apparatus, perform the discarding process when the pseudorandom number included in the communication frame identifier matches the pseudorandom number generated by the third generator, and the frame identifier included in the communication frame identifier does not match the frame identifier that is predetermined to be received by the receiving apparatus, and perform the attack determination process when the pseudorandom number included in the communication frame identifier does not match the pseudorandom number generated by the third generator.

3. The system according to claim 1, wherein transmission and reception of the communication frame between the transmitting apparatus and the receiving apparatus is performed according to CSMA/CR.

4. The system according to claim 3, wherein transmission and reception of the communication frame between the transmitting apparatus and the receiving apparatus is performed based on CAN or CAN-FD.

5. The system according to claim 1, wherein each of the first generator and the third generator is configured to generate the pseudorandom number by performing a computation based on the algorithm rising a same predetermined initial value when the communication system is started.

6. The system according to claim 5, wherein each of the first generator and the third generator is configured to update the pseudorandom number by performing a computation based on the algorithm every time transmission and reception of the communication frame between the transmitting apparatus and the receiving apparatus succeed.

7. The system according to claim 6, wherein the algorithm includes a procedure of regularly changing a data length of the pseudorandom number.

8. The system according to claim 5, further comprising an updater configured to update the initial value, wherein the first generator and the third generator are configured to generate, every time the initial value is updated by the updater, the pseudorandom number by performing a computation based on the algorithm using the updated initial value.

9. A receiving apparatus that is connected to a transmitting apparatus configured to transmit a communication frame, the receiving apparatus comprising:

a pseudorandom number generator configured to generate a first pseudorandom number with two or more bits based on an algorithm common to the transmitting apparatus, synchronously with the transmitting apparatus;

a receiver configured to receive the communication frame that includes a communication frame identifier at least including a frame identifier and a second pseudorandom number with two or more bits generated by the transmitting apparatus, the frame identifier indicating a type of the communication frame;

a comparator configured to compare the first pseudorandom number with the second pseudorandom number, and to compare the frame identifier included in the communication frame identifier with a frame identifier that is predetermined to be received by the receiving apparatus; and a processor configured to perform any one of a frame process for making use of the communication frame, a discarding process for discarding the communication frame, and an attack determination process for determining that the communication frame is an attack from an unauthorized third party, based on a comparison result of the comparator.

10. The receiving apparatus according to claim 9, wherein the processor is configured to perform the frame process when the first pseudorandom number matches the second pseudorandom number, and the frame identifier included in the communication frame identifier matches the frame identifier that is predetermined to be received by the receiving apparatus, perform the discarding process when, the first pseudorandom number matches the second pseudorandom number, and the frame identifier included in the communication frame identifier does not match the frame identifier that is predetermined to be received by the receiving apparatus, and perform the attack determination process when the first pseudorandom number does not match the second pseudorandom number.

11. The receiving apparatus according to claim 9, wherein transmission and reception of the communication frame between the transmitting apparatus and the receiving apparatus is performed according to CSMA/CR.

12. The receiving apparatus according to claim 11, wherein transmission and reception of the communication frame between the transmitting apparatus and the receiving apparatus is performed based on CAN or CAN-FD.

13. The receiving apparatus according to claim 9, wherein the pseudorandom number generator is configured to generate the first pseudorandom number by performing a computation based on the algorithm using a same predetermined initial value as used by the transmitting apparatus to generate the second pseudorandom number when a communication system is started, the communication system including the receiving apparatus and the transmitting apparatus.

14. The receiving apparatus according to claim 13, wherein the pseudorandom number generator is configured to update the first pseudorandom number by performing a computation based on the algorithm every time transmission and reception of the communication frame between the transmitting apparatus and the receiving apparatus succeed.

15. The receiving apparatus according to claim 14, wherein the algorithm includes a procedure of regularly changing a data length of a pseudorandom number.

16. The receiving apparatus according to claim 13, wherein further comprising an updater configured to update the initial value, wherein
the pseudorandom number generator is configured to generate, every time the initial value is updated by the updater, the first pseudorandom number by performing a computation based on the algorithm using the updated initial value.

17. A receiving method executed by a receiving apparatus that is connected to a transmitting apparatus configured to transmit a communication frame, the method comprising:
generating a first pseudorandom number with two or more bits based on an algorithm common to the transmitting apparatus, synchronously with the transmitting apparatus;
receiving the communication frame that includes a communication frame identifier at least including a frame identifier and a second pseudorandom number with two or more bits generated by the transmitting apparatus, the frame identifier indicating a type of the communication frame;
comparing the first pseudorandom number with the second pseudorandom number, and comparing the frame identifier included in the communication frame identifier with a frame identifier that is predetermined to be received by the receiving apparatus; and
performing any one of a frame process for making use of the communication frame, a discarding process for discarding the communication frame, and an attack determination process for determining that the communication frame is an attack from an unauthorized third party, based on a result of the comparing.

18. A computer program product comprising a non-transitory computer-readable medium including programmed instructions causing a receiving apparatus, which is connected to a transmitting apparatus configured to transmit a communication frame, to function as:
a pseudorandom number generator configured to generate a first pseudorandom number with two or more bits based on an algorithm common to the transmitting apparatus, synchronously with the transmitting apparatus;
a receiver configured to receive the communication frame that includes a communication frame identifier at least including a frame identifier and a second pseudorandom number with two or more bits generated by the transmitting apparatus, the frame identifier indicating a type of the communication frame;
a comparator configured to compare the first pseudorandom number with the second pseudorandom number, and to compare the frame identifier included in the communication frame identifier with a frame identifier that is predetermined to be received by the receiving apparatus; and
a processor configured to perform any one of a frame process for making use of the communication frame, a discarding process for discarding the communication frame, and an attack determination process for determining that the communication frame is an attack from an unauthorized third party, based on a comparison result of the comparator.

* * * * *